(12) United States Patent
Weinberg et al.

(10) Patent No.: US 7,870,162 B2
(45) Date of Patent: *Jan. 11, 2011

(54) METHOD FOR GENERATING PROPERLY FORMED EXPRESSIONS

(75) Inventors: Paul Weinberg, Los Angeles, CA (US); Wenphing Lo, Alhambra, CA (US); Rich Endo, Los Angeles, CA (US)

(73) Assignee: SAP AG, Walldorf (DE)

( * ) Notice: Subject to any disclaimer, the term of this patent is extended or adjusted under 35 U.S.C. 154(b) by 328 days.

This patent is subject to a terminal disclaimer.

(21) Appl. No.: 11/193,641

(22) Filed: Jul. 29, 2005

(65) Prior Publication Data

US 2007/0027858 A1 Feb. 1, 2007

(51) Int. Cl.
 *G06F 7/00* (2006.01)
 *G06F 17/30* (2006.01)
 *G06F 15/16* (2006.01)
(52) U.S. Cl. .................................................. 707/802
(58) Field of Classification Search ............ 705/8; 707/104, 1–9, 100–101, 102, 999.001, 999.102, 707/736, 763, 802, 999.101; 717/101–124; 704/5; 706/59, 902–925
See application file for complete search history.

(56) References Cited

U.S. PATENT DOCUMENTS

| | | | | |
|---|---|---|---|---|
| 5,798,757 | A * | 8/1998 | Smith | 715/709 |
| 5,832,481 | A * | 11/1998 | Sheffield | 1/1 |
| 6,026,410 | A * | 2/2000 | Allen et al. | 707/104.1 |
| 6,199,047 | B1 * | 3/2001 | Dimino et al. | 705/10 |
| 6,535,883 | B1 | 3/2003 | Lee et al. | |
| 6,658,622 | B1 | 12/2003 | Aiken et al. | |
| 6,801,905 | B2 * | 10/2004 | Andrei | 707/2 |
| 6,868,413 | B1 * | 3/2005 | Grindrod et al. | 706/925 |
| 6,920,461 | B2 | 7/2005 | Hejlsberg et al. | |
| 7,003,730 | B2 | 2/2006 | Dettinger et al. | |
| 7,124,145 | B2 * | 10/2006 | Surasinghe | 1/1 |
| 7,137,100 | B2 * | 11/2006 | Iborra et al. | 717/106 |
| 7,168,035 | B1 * | 1/2007 | Bell et al. | 715/234 |
| 7,209,911 | B2 * | 4/2007 | Boothby et al. | 707/2 |
| 7,296,017 | B2 * | 11/2007 | Larcheveque et al. | 1/1 |
| 2003/0115186 | A1 | 6/2003 | Wilkinson et al. | |
| 2003/0154191 | A1 | 8/2003 | Fish et al. | |
| 2004/0006608 | A1 | 1/2004 | Swarna et al. | |
| 2004/0073868 | A1 | 4/2004 | Easter et al. | |

(Continued)

*Primary Examiner*—Cam Y Truong
*Assistant Examiner*—Cecile Vo
(74) *Attorney, Agent, or Firm*—Buckley, Maschoff & Talwalkar LLC

(57) ABSTRACT

A method for generating properly formed expressions used as validation expressions and search filters for computer system database applications. One or more embodiments of the invention for example comprise an interface that assists users through the use of automatic tokenizing and/or pick lists of field names and fields values, including a measurement builder for entering legal tokenized measurement values with applicable units of measure. Embodiments of the invention allow knowledgeable users to rapidly create expressions to ensure that the legal syntax and semantics of an expression are not violated while providing the user with pick lists and measurement values within legal ranges and with applicable units of measure. Validations rules are generated and performed on desired records in a computer system database without requiring programs, scripts or queries to be written. A validation expression returns a Boolean result that signifies a success or failure result and may be performed manually or automatically.

12 Claims, 9 Drawing Sheets

U.S. PATENT DOCUMENTS

| | | |
|---|---|---|
| 2004/0162741 A1 | 8/2004 | Flaxer et al. |
| 2005/0289517 A1 | 12/2005 | Balfe et al. |
| 2006/0041421 A1 | 2/2006 | Ta et al. |
| 2006/0053106 A1* | 3/2006 | Bhaghavan et al. ............ 707/4 |
| 2006/0074731 A1* | 4/2006 | Green et al. ................... 705/8 |
| 2006/0122956 A1 | 6/2006 | Shimogori |
| 2006/0167905 A1 | 7/2006 | Liu et al. |
| 2006/0224959 A1* | 10/2006 | McGuire et al. ............ 715/700 |
| 2006/0253466 A1 | 11/2006 | Upton |
| 2006/0253831 A1 | 11/2006 | Harper et al. |
| 2007/0027847 A1 | 2/2007 | Weinberg et al. |
| 2007/0027890 A1 | 2/2007 | Poyourow et al. |
| 2007/0028079 A1 | 2/2007 | Weinberg et al. |

* cited by examiner

Figure 6

| Records | | | | |
|---|---|---|---|---|
| | Check Pri | Check SK | SKU | Description |
| | ✓ | ✓ | CA (200) 135-12 | Superia Print Film |
| | ✓ | ✓ | CA (200) 135-24 | Superia Print Film |
| | ✓ | ✓ | CA (200) 135-36 | Superia Print Film |
| | ✗ | ✓ | CH (400) 135-12 | Superia Print Film |
| | ✓ | ✓ | CH (400) 135-24 | Superia Print Film |
| | ✓ | ✗ | CH (400) 135-36 | Superia Print Film |
| | ✓ | ✓ | CN (100) 135-12 | Superia Print Film |
| | ✓ | ✓ | CN (100) 135-24 | Superia Print Film |
| | ✓ | ✗ | CZ (800) 135-36 | Superia Print Film |
| | ✓ | ✓ | EB (100) 135-24 | Ektachrome Elite Slide Film |
| | ✓ | ✓ | EB (100) 135-36 | Ektachrome Elite Slide Film |

601 → Check Pri column
602 → Check SK column

METHOD FOR GENERATING PROPERLY FORMED EXPRESSIONS

BACKGROUND OF THE INVENTION

1. Field of the Invention

Embodiments of the invention described herein pertain to the field of computer systems. More particularly, but not by way of limitation, one or more embodiments of the invention enable methods for generating properly formed expressions for validation of specified records in a computer system database wherein the expressions are generated without writing programs, scripts or queries.

2. Description of the Related Art

Known methods for creating expressions for manipulating data in a computer system require complex and error prone expression entry. Wizards exist that help a user construct an expression, however the user must still have extensive programming knowledge in order to effectively create a expression. The user must for example still understand the rules and syntax for creating a properly formed expression. Wizards help to create properly formed expressions, however known wizards are primarily concerned with aiding a user in the formatting nuances associated with complex expressions. Wizards do not allow for validation rules to be defined as expressions, and do not allow for the expressions to be performed manually over selected records and do not show the success or failure of the validation in association with the records themselves. In addition, known expression creation tools do not allow for validations to be grouped, do not allow for validations to be called from workflows, do not allow for the expressions to be automatically performed upon database updates and do not allow for searches to be conducted to find records that match the expression.

For at least the limitations described above there is a need for a method for generating properly formed expressions.

BRIEF SUMMARY OF THE INVENTION

One or more embodiments of the invention enable methods for generating properly formed expressions. One or more embodiments of the invention for example comprise an interface that assists users through the use of automatic tokenizing and/or pick lists of field names and fields values, including a measurement builder for entering legal tokenized measurement values with applicable units of measure. Embodiments of the invention allow knowledgeable users to rapidly create expressions to ensure that the legal syntax and semantics of an expression are not violated while providing the user with pick lists and measurement values within legal ranges and with applicable units of measure. Validations comprise metadata and validation rules. Validations rules are generated and performed on desired records in a computer system database without requiring programs, scripts or queries to be written. The validation rules are generated or created using tokenized expressions generated with one or more embodiments of the invention wherein the rules are also known as validation expressions. After a validation expression is created it may then be performed with respect to one or more records. A validation expression returns a Boolean result that signifies a success or failure result.

As utilized in the context of this disclosure, "attributes" are quantities that are associated with subsets of the main data table, i.e., specific to a given category. "Fields" are associated with all records of the main data table, i.e., all records in the main data table comprise the same fields. However, based on the value of a category field or other any other fields of the main data table, attributes may be associated with a subset of the records of the main data table. An "audience" may be thought of as a third dimension added on top of the main data table and attribute tables so that audiences that comprise different languages, regions, regulatory zones, or any other subdivision based on any quantity may be used to form a hierarchy upon which to find data for fields or attributes that are not found on a given audience level in the database. Audiences can be as complex as required to support the number of targets and number of languages, regions, religions, cultures or any other division conceivable. An audience hierarchy may be formed from the viewpoint of a given audience to take advantage of the entries of most of the other fields of another audience, so that multiple audiences that are similar may be readily supported. For example, to support a catalog targeting the United Kingdom, the word "colour" in a field or attribute would simply need to have the word "color" replaced in order to support the same catalog targeted at the United States. By making one audience inherit from another, any entries not found in one audience are automatically obtained from another audience. This increases the integrity of the data and allows for one edit to alter the output for as many audiences as use a piece of data. "Lookup tables" are used in order to place a text object for example in one place in the database and which are referenced by a smaller quantity, i.e., a reference identifier or key into the lookup table.

A validation expression can define intra-record tests and inter-record tests with unlimited complexity. Specifically, validation expressions can reference fields and attributes (using any table including the main table, lookup tables and non-lookup sub-tables), perform arithmetic, string, and logical operations, call built-in functions, and even reference other previously defined validations. A validation expression is token-based, so that a user is not required to manually type field, attribute, operator or function names. Instead, the tokens to be used in the expression are selected from drop-down lists, reducing the potential for typing error. For example, pre-defined dimensions and units of measure allow for tokenized input of these elements without requiring manual typing of the desired dimension or unit of measure. A validation expression may branch on audience, family or category values within a validation. The specific branch is then performed based on the value of the audience, family or category specific value for one or more designated records.

Validation expressions can be used to perform a variety of tests that implement sophisticated business logic that goes far beyond simple data integrity checks, including:

Ensuring that specific fields have non-Null values when other fields have a particular value.

Ensuring that non-lookup fields (fields without pick lists) have a legal value (e.g. Price>0).

Comparing the values of different fields to ensure that the relative values are legal (e.g. Price>Cost).

Ensuring that a workflow task is not allowed to proceed until workflow related validations return successful status.

BRIEF DESCRIPTION OF THE DRAWINGS

The above and other aspects, features and advantages of the invention will be more apparent from the following more particular description thereof, presented in conjunction with the following drawings wherein:

FIG. 6 illustrates an embodiment of the record details user interface comprising columns representing validation results.

DETAILED DESCRIPTION

Figure 1:
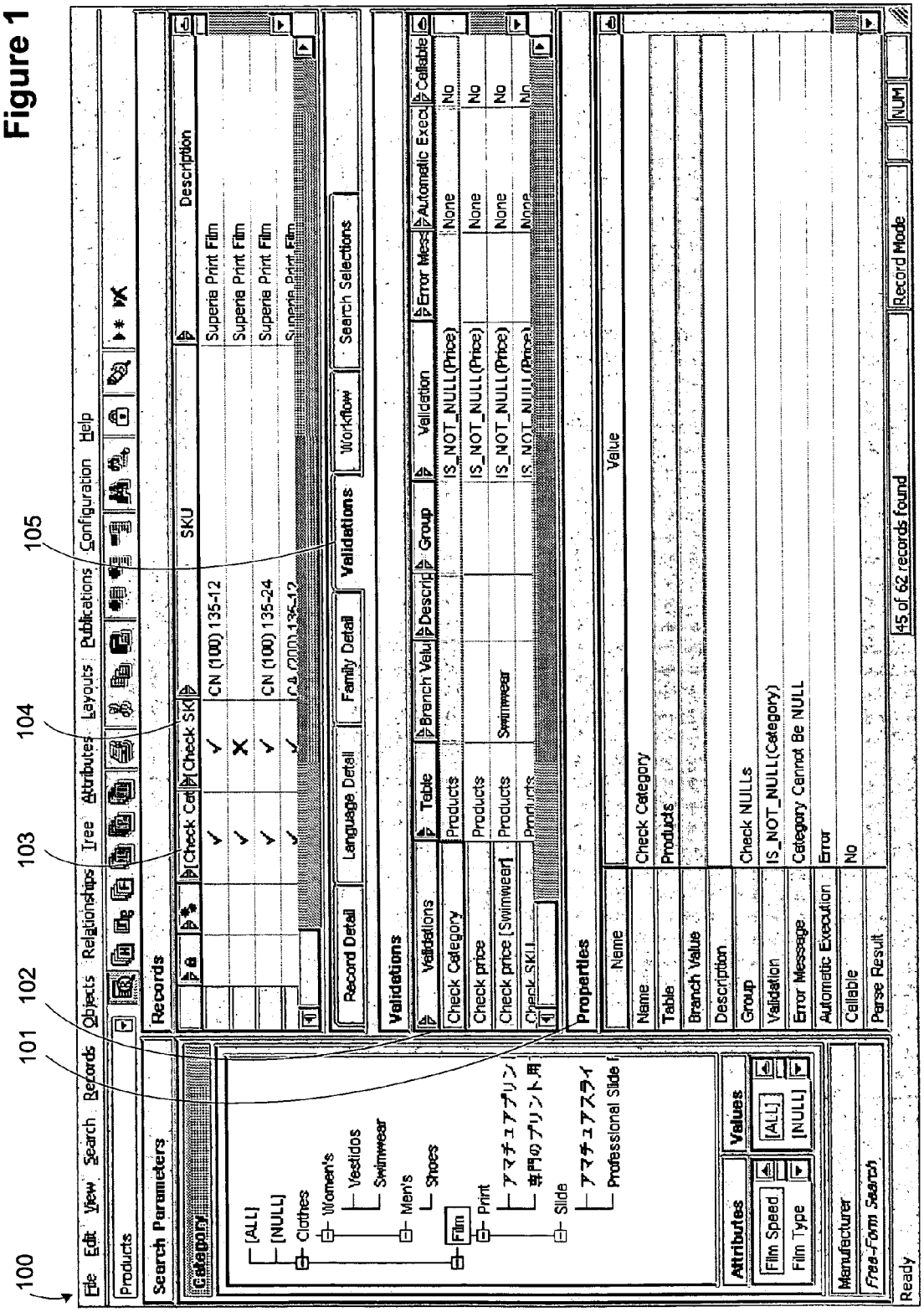
FIG. 1 illustrates an embodiment of an application comprising a validation metadata user interface.

A method for generating properly formed expressions will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Expressions created using one or more embodiments of the invention are used as validation rules which are also known as validation expressions. One or more embodiments of the invention for example comprise an interface that assists users through the use of automatic tokenizing and/or pick lists of field names and fields values, including a measurement builder for entering legal tokenized measurement values with applicable units of measure. Embodiments of the invention allow knowledgeable users to rapidly create expressions to ensure that the legal syntax and semantics of an expression are not violated while providing the user with pick lists and measurement values within legal ranges and with applicable units of measure. Validations are made up of metadata and validation rules. Validations rules are defined and performed on desired records in a computer system database without requiring programs, scripts or queries to be written. The validation rules are created using tokenized expressions. After a validation expression is created it may then be performed with respect to one or more records. A validation expression returns a Boolean result that signifies a success or failure result.

A validation expression can define intra-record tests and inter-record tests with unlimited complexity. Specifically, validation expressions can reference fields and attributes (using any table including the main table, lookup tables and non-lookup sub-tables), perform arithmetic, string, and logical operations, call built-in functions, and even reference other previously defined validations. A validation expression is token-based, so that a user is not required to manually type field, attribute, operator or function names. One or more embodiments of the invention allow for the automatic generation of pick lists as a user types so as to allow for a reduced number of tokenized values to be presented to the user for selection. The tokens to be used in the expression that are selected from drop-down lists reduce the potential for typing error. For example, pre-defined dimensions and units of measure allow for tokenized input of these elements without requiring manual typing of the desired dimension or unit of measure. A validation expression may branch on audience, family or category values within a validation. The specific branch is then performed based on the value of the audience, family or category specific value for one or more designated records.

FIG. 1 illustrates an embodiment of an application comprising a validation metadata user interface. The elements in application 100 comprise a validation tab 105 comprising rows of validations 102, each of which extends horizontally showing the name of the validation (e.g., "Check Category", "Check Price", "Check Price[Swimwear]", "Check SKU"), the table(s) associated with the validation, the branch value(s) used for branching the validation, a description of the validation, the group(s) that the validation is associated with, the validation expression, an error message to display when the validation fails, an automatic execution value of none, warning or error, a callable flag for determining if the validation is callable from another validation and a parse result read-only success or failure field that shows the results of parsing the validation expression. The properties of a selected validation, in this case the "Check Category" row in rows of validations 102 are shown in validation properties edit area 101. Each row in validation properties edit area 101 corresponds to each column in rows of validations 102. Each row in validation properties edit area 101 is edited by clicking the mouse in the corresponding row and entering information. The result of executing a validation or validation group is shown as a column in the records list, for example "[Check Category]" 103 and "[Check SKU]" 104 showing the status of each validation for example as will be described further below.

A validation expression may be performed manually or automatically. In either case, when a validation expression is performed with respect to one or more records, the success or failure is indicated for each record in an interface. A validation expression may be performed manually or automatically for a database update to warn against or prevent the entry of invalid data and ensure data integrity. A validation expression may also be automatically performed from one or more workflows to implement a business process with system-enforced data integrity. Similarly, the validation metadata may comprise a setting that signifies the level of execution as being warning and error. Executing the validation refers to executing the validation expression. Any method of executing the validation or validation expression is in keeping with the spirit of the invention.

A validation expression may be placed into one or more groups and performed as a group with the success or failure indicated for each record for example visually. Each validation group is a set of validations that can be performed as a group as a single operation rather than requiring each individual validation to be separately performed. Validation groups allow for the organized use of large sets of related validations, eliminating the likelihood of forgetting to perform any of the individual validations in the group. For example, Trading Partner X may have a total of 125 validations while Trading Partner Y has a total of 143 validations, many of them in common with Trading Partner X. When a validation group is performed against a set of records, it is as if each individual validation in the group has been performed, and an individual success or failure result for each validation for each record is generated.

An individual validation or validation group is performed manually by selecting one or more records to validate, right-clicking on one of the records and choosing validations from the context menu. Alternatively, choosing Records>Validations from the main menu also performs an individual validation or validation group. One embodiment of the execution menu comprises an execute menu item and an execute group menu item. Upon choosing execute or execute group, a second level of menu items appears comprising the names of the validations to perform. The specified validation or validation group is then performed and a message dialog is displayed indicating success or failure. The validations that are executed are shown as columns in the records area as previously described in one or more embodiments of the invention.

Figure 2:
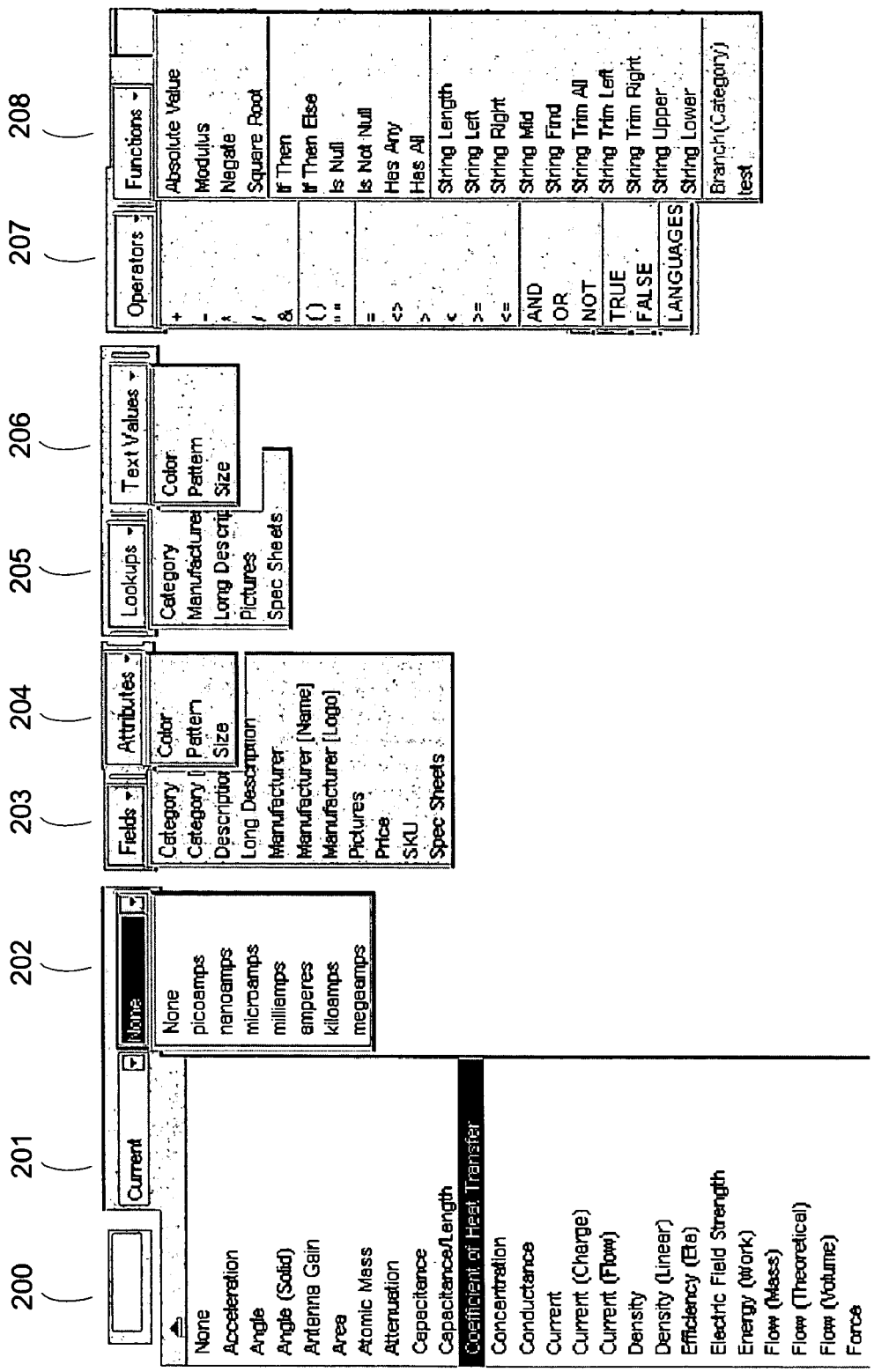
FIG. 2 illustrates embodiments of the inputs in exploded format that are shown in the validation expression builder interface of FIG. 3.
Figure 3:
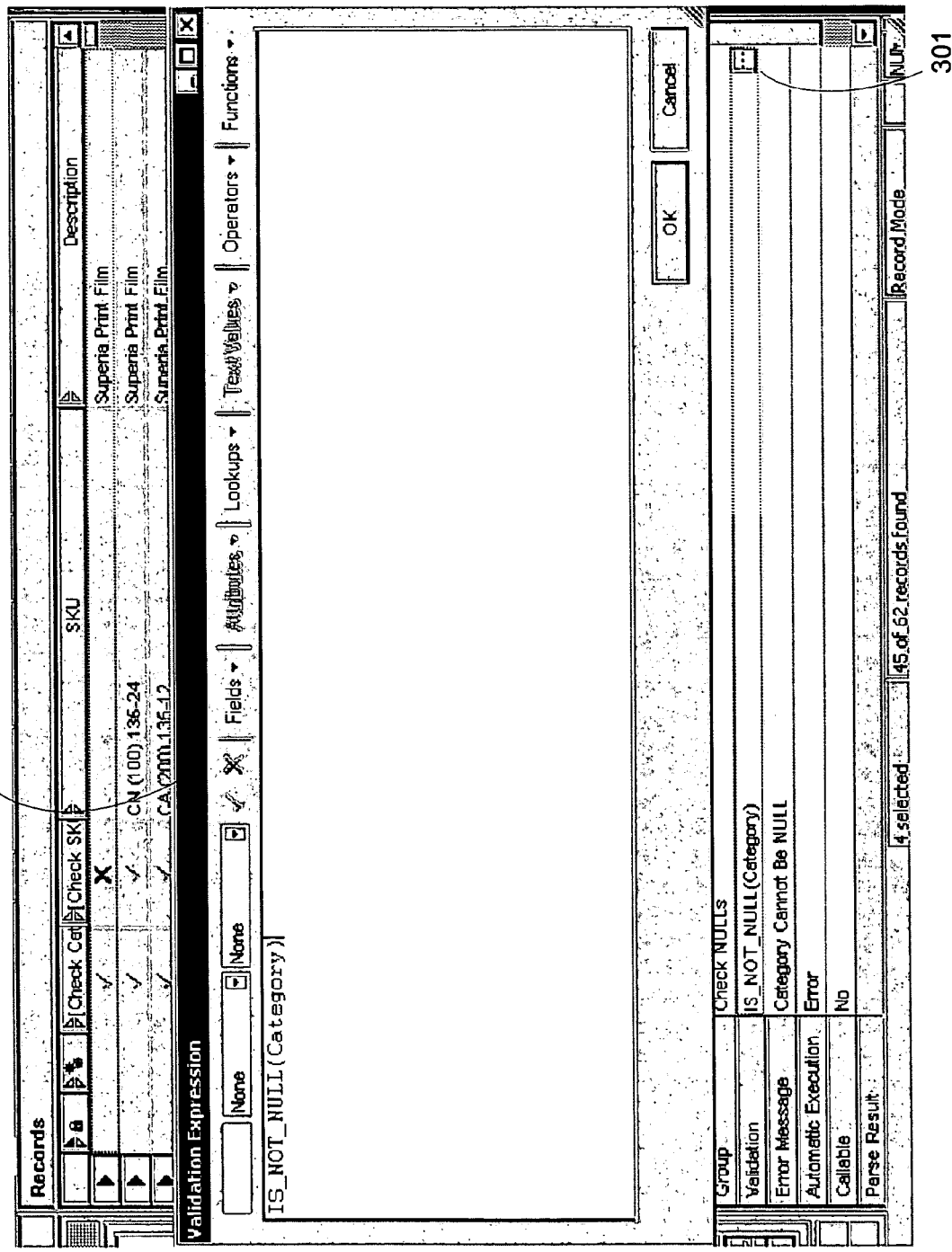
FIG. 3 illustrates an embodiment of the validation expression builder user interface.
Figure 9:
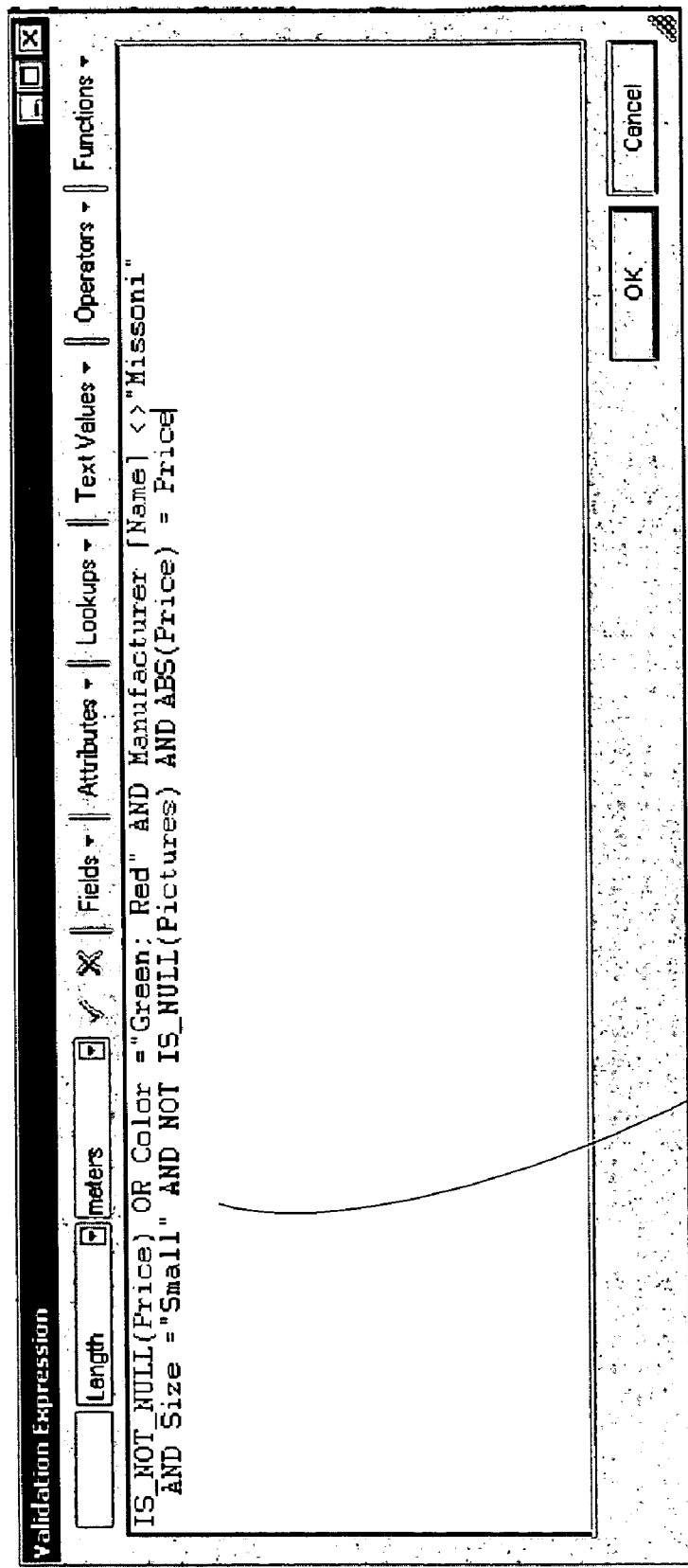
FIG. 9 illustrates a complex validation expression created without character based typing.

FIG. 3 illustrates an embodiment of the validation expression builder user interface 302 that is invoked when ellipsis interface element 301 is asserted. The elements along the interface include a numeric measure value text field input, dimension input, unit of measure input, field input, attribute input, lookup input, text value input, operator input and function input. Through use of tokenized values for dimensions, units of measure, fields, attributes, lookups, text values, operators and functions, a large body of errors associated with manual expression entry is eliminated from the validation expression generation process. Each of these input fields are shown exploded in FIG. 2. The elements include numeric measure value input 200, dimension input 201 with a partial list of dimensions shown, unit input 202 corresponding to the current setting of dimension set via dimension input 201, field input 203 comprising the fields in the main table, attribute input 204 corresponding to the attributes available based on the selected records, lookup input 205, text value input 206 for obtaining text values for defined attributes, operator input 207 and function input 208. By entering selections into these inputs, an expression is built. Generally the only text based input that is used is when entering a number into numeric measurement value input 200. Eliminating entry of expressions through character based input reduces the number of errors in the finished expressions. In addition, by having pre-defined tokens that are enabled or disabled as the system accepts user input based on the expression as it is built, syntax errors are greatly reduced. The system provides values to the user so that the user does not have to guess what the table, field, attributes, lookup values or operator and function values should be. FIG. 9 illustrates a complex validation expression created without character based typing.

Validation groups may be organized into a hierarchy. A validation group hierarchy is similar to a data group hierarchy in that it does not show up in the drop-down list of tables and cannot be edited directly. Instead, the validation group hierarchy may be edited in one or more embodiments of the invention using a tree view user interface element or any other type of interface element capable of displaying a hierarchy. For example, the hierarchy may then be modified using a context menu editable tree to add siblings and children, and to delete and rename existing nodes.

Validation execution results in different behaviors based on the level of execution of the validation. For example, in one level a validation execution can be designated as a warning validation. In this mode a warning is displayed to a user before saving a record if a validation fails, although the record update still occurs. In another level of execution, a validation execution may be designated as an error validation for example. In this mode, the user interface displays the error and also prevents the record from being saved if a validation fails, i.e., if the Boolean value returned from the validation is FALSE. For validation groups, the final outcome of multiple validations are the results of each and every validation, so if any of the validations in a group fails, and the level of execution for the failed validation is warning level, then the warning is displayed and if the level of execution for another failed validation is error level, then the error is displayed and the update does not occur with respect to the data record that the validation refers to. Other embodiments of the invention may perform short circuit checking and display only the first error encountered in case of a large amount of validation errors related to one element. This saves the user from interacting with a multiplicity of error dialogs for example. Other embodiments of the invention may utilize a global level of execution for a validation group so that if any validation in the group fails, the whole group fails which prevents any of the updates associated with the group from occurring. Any other method of combining the results of the validations in a validation group are in keeping with the spirit of the invention.

Figure 7:
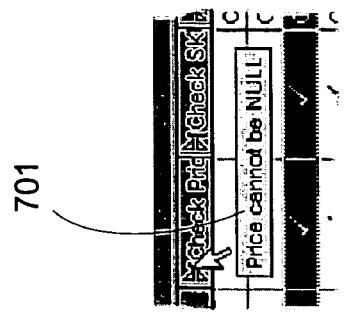
FIG. 7 illustrates a portion of an embodiment of the record details user interface comprising a tooltip showing a warning message associated with the validation result associated with the column.

After performing a validation, a column may be added to the display of records for each validation indicating success or failure for that validation for each and every record, as shown in FIG. 6. Each validation result column may be named with the validation name in square brackets ([ ]) to denote that the column is not actually a field in the record. Naming the columns in this manner is not a requirement but simply signifies that the column is not a field in the database. Each validation result Boolean (TRUE or FALSE) value may be shown as check marks for TRUE or X's for FALSE results in the column, any other method of showing TRUE and FALSE values is in keeping with the spirit of the invention. When the mouse pointer is moved over the column title, a tooltip may be displayed showing the error message associated with the validation, as shown in FIG. 7. Any other method of showing the error associated with a validation column is in keeping with the spirit of the invention. Each validation result column may be sorted to group records that failed or succeeded with respect to the validation. Each record may then be edited to correct observed error(s). Sorting the columns may be performed by clicking on the column header. Clicking a second time on the column header switches the order of the records from ascending to descending with respect to the value in the field. See FIG. 7, by clicking at the location of the pointer the validation column is sorted with correctly validating rows separated from records that fail validation. Clicking again in the column header switches the uppermost records (for example the correctly validating records) with the lowermost records (for example the records failing validation).

When combined with a user interface that visually displays records, a validation expression is in effect a search expression. Since a record matching a search either matches or does not match a search, the value of searching for a given value or combination of values is a Boolean. Therefore, since validations of embodiments of the present invention return Boolean values, i.e., TRUE and FALSE, the validation expressions described herein may be used as searches. In this manner, the creation of expressions for searching for particular records does not have to be duplicated within a separate search facility since the records that successfully match a validation or fail a validation are defined by the validation expression itself. A drill down search for example may make use of a validation for further drilling down into a database. For example, by dragging and dropping a validation listed in rows of validations 102 to the search parameters pane in the leftmost tree view in FIG. 1, further drill down into the records shown in the upper right portion of FIG. 1 is achieved. By performing a SHIFT-drag and drop of the validation listed in rows of validations 102 into the search parameters pane in the leftmost tree view in FIG. 1, the validations that fail are drilled down into. Another embodiment of the invention makes the default drag and drop action correspond to drilling down into records that fail validation and conversely SHIFT-drag and drop allows for records that correctly validate to be drilled down. Any other method of instantiating validations to further limit a search are in keeping with the spirit of the invention including use of another vertical tab named "Validation", i.e., in addition to the "Category", "Manufacturer" and "Free-Form Search" vertical tabs on the left side of FIG. 1 from which to select validations to use for searching. A Validation vertical tab may comprise a list of validations or a list or tree of the validations within validation groups that can be click on to provide further limiting of the category or manufacturer or free-form searches. The Category vertical pane shown in FIG. 1 with the tree view is a hierarchical split of the main data table for example a product table into a taxonomy of products. By clicking in the tree, all of the records that belong to that portion of the taxonomy are displayed in the upper right portion of FIG. 1, the record list. The Manufacturer vertical tab, when asserted, displays a manufacturer pane that lists all of the manufactures in the main data table, i.e., the manufacturers of the products that are listed in the main data table. Combining these is one method of creating a hierarchical family taxonomy that builds on the existing category hierarchy in the main data table.

Figure 8:
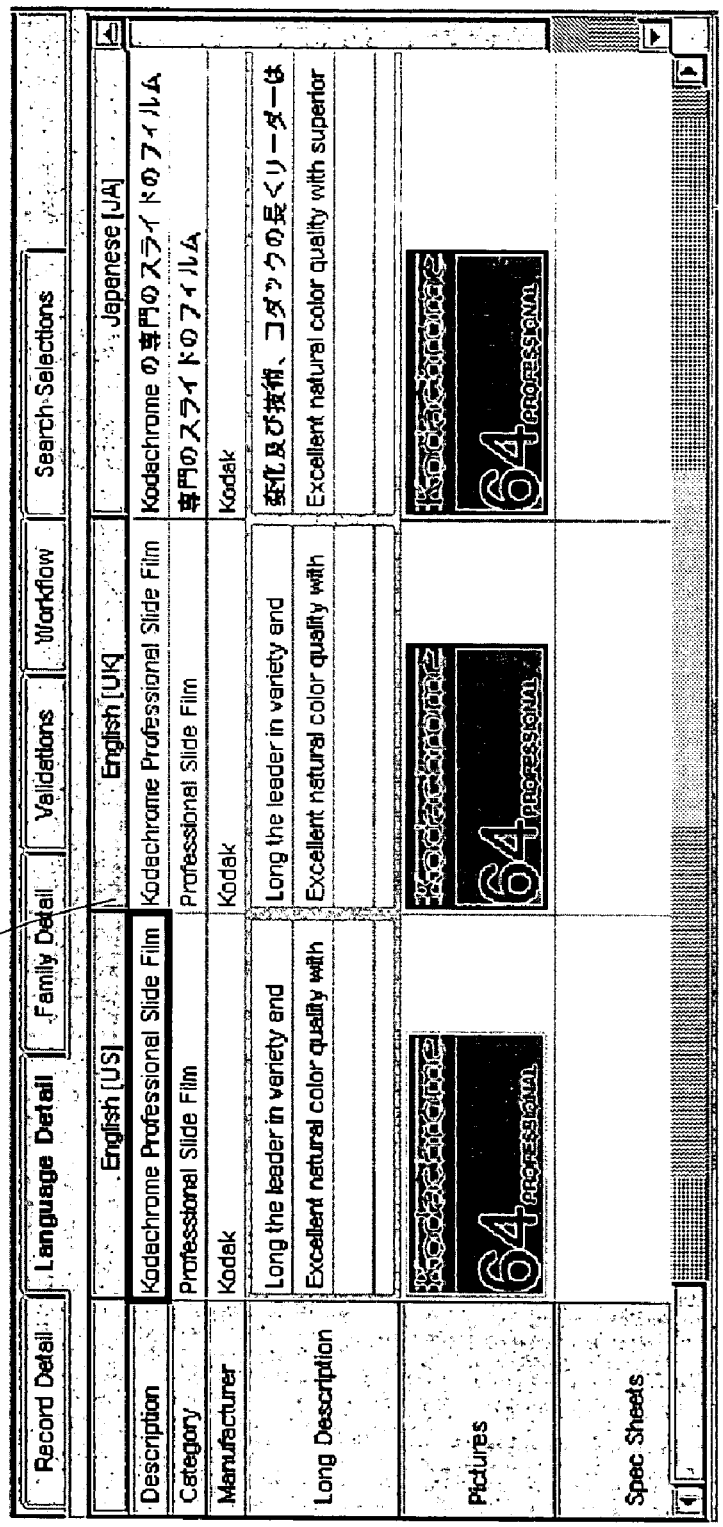
FIG. 8 illustrates an embodiment of the audience user interface pane.

Attributes are quantities that are associated with subsets of the main data table, i.e., specific to a given category. Fields are associated with all records of the main data table, i.e., all records in the main data table comprise the same fields, however, based on the category or other any other fields of the main data table, attributes may be associated with a subset of the records of the main data table. An audience may be thought of as a third dimension added on top of the main data table and attribute tables so that audiences that comprise different languages, regions, regulatory zones, or any other subdivision based on any quantity may be used to form a hierarchy upon which to find data for fields or attributes that are not found on a given audience level in the database. In other words, a hierarchy may be formed from the viewpoint of a given audience to take advantage of the entries of most of the other fields of another audience, so that multiple audiences that are similar may be readily supported. For example, to support a catalog targeting the United Kingdom, the word "colour" in a field or attribute would simply need to have the word "color" replaced in order to support the same catalog targeted at the United States. By making one audience inherit from another, any entries not found in one audience are automatically obtained from another audience. This increases the integrity of the data and allows for one edit to alter the output for as many audiences as use a piece of data. FIG. 8 illustrates an embodiment of the audience user interface an embodiment of which has been simplified to be language and country specific. Audience pane 800, comprises a horizontal set of columns that represent the supported audiences and with a vertical axis display each field for selected records comprising fields named description 801, category 802, manufacturer 803, long description 804 and pictures 805. For each field, any value that is not found in the leftmost column, e.g., "English [US]", is taken from the next column to the right. In addition, the record interface may display each of the primary level of inheritance fields in black and the inherited fields in other colors or bold to show that they are inherited and are not found with respect to the audience through which the user has chosen to view the data with. Other methods of forming a hierarchy of audiences that is not table specific are in keeping with the spirit of the invention, such as forming a hierarchy of audiences in a table or tree.

A validation expression may branch on audience level/name/value, family or category field or attribute values within a validation. The specific branch is then performed based on the value of the audience, family or category specific value for one or more designated records. Allowing validations to branch based on an audience, family or category specific field or attribute value allows a specific validation to be performed based on the given value. Collectively, the set of branch validations corresponding to the set of audience, family or category specific values allows for a single parent validation to be performed on a group of records from multiple audiences, families or categories with the specific validation automatically invoked for each record.

Figure 4:
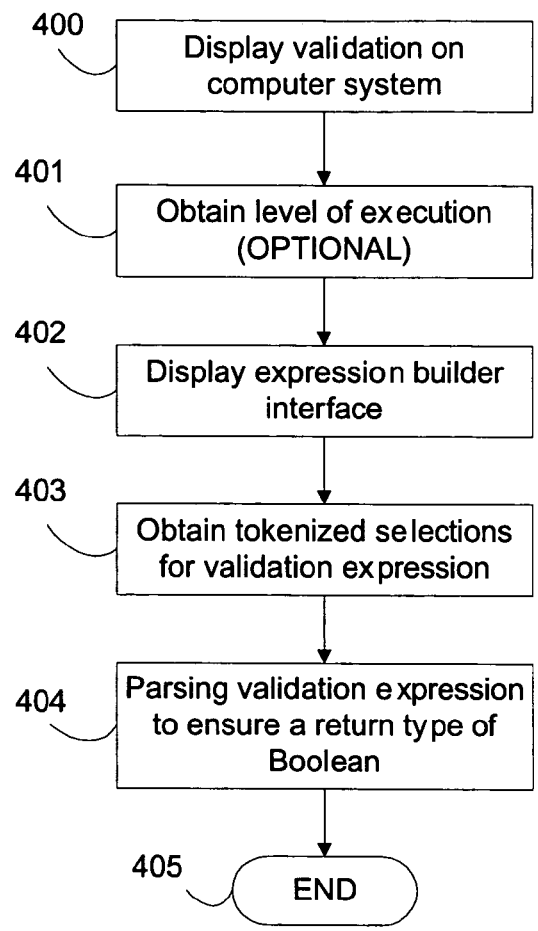
FIG. 4 illustrates a flowchart of an embodiment of a method for generating properly formed expressions.

FIG. 4 illustrates a flowchart detailing a method for performing expression based validation. A validation is displayed at 400, the properties of the validation may be viewed and edited at this time, or the validation may be displayed to a software module programmatically. The level of execution is optionally obtained at 401 which comprises selecting warning level or error level. Any other granularity of levels may be implemented in keeping with the spirit of the invention. The validation expression builder interface is displayed at 402. The system obtains tokenized selections from a user or other program at 403 which build the validation expression without requiring character by character typing or syntax knowledge. The validation expression is parsed at 404 to ensure that the expression correctly parses and primarily to ensure that the expression returns a type of Boolean.

Figure 5:
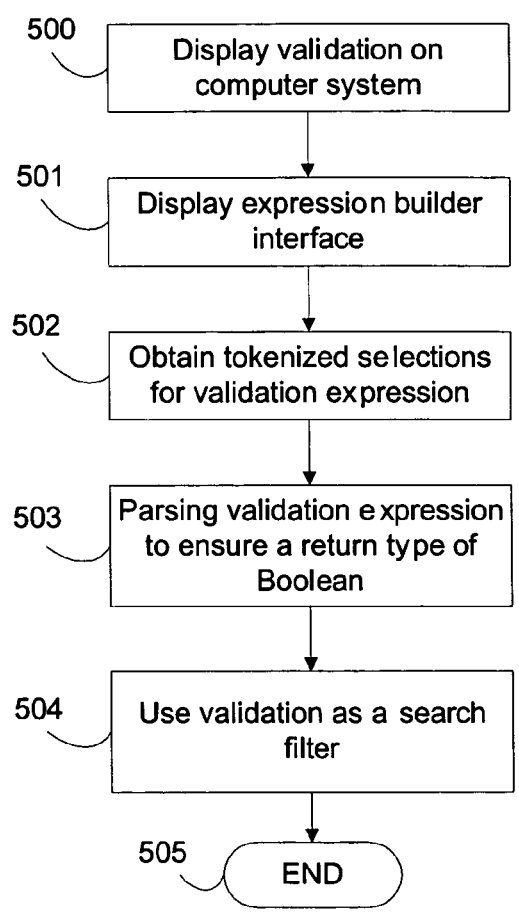
FIG. 5 illustrates a flowchart of another embodiment of a method for generating properly formed expressions.

FIG. 5 illustrates a flowchart detailing another embodiment of a method for performing expression based validation. A validation is displayed at 500, the properties of the validation may be viewed and edited at this time, or the validation may be displayed to a software module programmatically. The validation expression builder interface is displayed at 501. The system obtains tokenized selections from a user or other program at 502 which build the validation expression without requiring character by character typing or syntax knowledge. The validation expression is parsed at 503 to ensure that the expression correctly parses and primarily to ensure that the expression returns a type of Boolean. The validation is used as a search filter at 504, or used as part of or in combination with a drill-down search, for example based on category, manufacturer or family.

U.S. Pat. No. 6,754,666 entitled "Efficient Storage And Access In A Database Management System" filed Aug. 21, 2000, U.S. patent application Ser. No. 09/643,207 entitled "Data Editing And Verification User Interface" filed Aug. 21, 2000, U.S. patent application Ser. No. 09/960,902 entitled "Method And Apparatus For Structuring, Maintaining, And Using Families Of Data" filed Sep. 20, 2001, U.S. patent application Ser. No. 11/142,809, entitled "Multi-Layered Data Model for Generating Audience Specific Documents" filed May 31, 2005, U.S. patent application Ser. No. 11/141,984 entitled "Interface for Indicating the Presence of Inherited Values in a Document" filed May 31, 2005 are all hereby incorporated herein by reference and used in combination with the embodiments of the invention enabled herein.

While the invention herein disclosed has been described by means of specific embodiments and applications thereof, numerous modifications and variations could be made thereto by those skilled in the art without departing from the scope of the invention set forth in the claims.

What is claimed is:

1. A method for generating properly formed expressions for validating selected records of a computer system database, said method comprising:
   displaying in a metadata user interface a plurality of selected records of a computer system database;
   displaying an expression-builder user interface coupled to said metadata user interface, said expression-builder user interface configured to construct at least one conditional validation expression, said expression-builder user interface comprising a token-based menu, said token-based menu automatically generated to comprise tokens representing and coupled to fields of said plurality of selected records;
   obtaining at least one branch value selection for at least one of a plurality of expressions comprising at least one tokenized branch value from said token-based menu;
   accepting user selections from said token based menu;
   computing said plurality of expressions, each expression comprising a properly-formed expression for validating said plurality of selected records comprising said user selections from said token-based menu;
   grouping said plurality of said expressions into a validation group;
   performing said plurality of expressions in said validation group as a single operation against said plurality of selected records; and
   displaying results of performing said plurality of expressions of said validation group, wherein displaying said results comprises displaying:
   an indicator of validity of data in each of said plurality of selected records, said indicator of validity of data visually coupled to each of said plurality of selected records and further comprising a plurality of levels of execution for each of said plurality of selected records, said levels of execution selected from the group consisting of: none, warning and error, wherein said indicator of validity comprises an error message indicating any invalid field of said selected records; and
   a parse result indicating a parsing validity of said plurality of expressions.

2. The method of claim 1 further comprising:
   using said plurality of expressions as a search filter; and
   limiting a drill-down search using said plurality of expressions in conjunction with said at least one branch value selection and a hierarchal search tool.

3. The method of claim 2 wherein said hierarchal search tool further comprises a free-form search tool.

4. The method of claim 1 wherein a tooltip is used to display said error message.

5. The method of claim 1 wherein said plurality of selected records further comprises a non-lookup field.

6. The method of claim 1, wherein said at least one branch value selection comprises an audience level of an audience hierarchy, wherein said computer system database comprises a plurality of audio players configured to inherit data based on said audience hierarchy such that entries not found in one audience layer are automatically obtained from another audience layer.

7. The method of claim 1, wherein said at least one branch value selection comprises a hierarchical family value.

8. The computer readable medium of claim 1, wherein said at least one branch value selection comprises a category value.

9. A method for generating properly formed expressions for validating selected records of a computer system database, said method comprising:
   displaying in a metadata user interface a plurality of selected records of a computer system database;
   displaying an expression-builder user interface coupled to said metadata user interface, said expression-builder user interface configured to construct at least one conditional validation expression, said expression-builder user interface comprising a token-based menu, said token-based menu automatically generated to comprise tokens representing and coupled to fields of said plurality of selected records;
   obtaining at least one branch value selection for at least one of a plurality of expressions comprising at least one tokenized branch value from said token-based menu;
   accepting user selections from said token-based menu;
   computing said plurality of expressions, each expression comprising a properly-formed expression for validating said plurality of selected records comprising said user selections from said token-based menu;
   grouping said plurality of said expressions into a validation group;
   performing said plurality of expressions in said validation group as a single operation against said plurality of selected records;
   displaying results of performing said plurality of expressions of said validation group, wherein displaying said results comprises displaying:
   a name of said plurality of expressions;
   a list of tables associated with said plurality of expressions;
   at least one branch value for branching at least one of said plurality of expressions;
   a description of said plurality of expressions;
   an indicator of validity of each of said plurality of selected records, said indicator of validity visually coupled to each of said plurality of selected records and further comprising a plurality of levels of execution for each of said plurality of selected records, said levels of execution selected from the group consisting of: none, warning and error, wherein said indicator of validity comprises an error message indicating any invalid field of said selected records;
   a callable flag; and
   a parse result indicating a parsing validity of said plurality of expressions; and
   applying said plurality of expressions as a search filter against said plurality of selected records.

10. The method of claim 9, wherein said at least one branch value selection comprises an audience level of an audience hierarchy, wherein said computer system database comprises a plurality of audio players configured to inherit data based on said audience hierarchy such that entries not found in one audience layer are automatically obtained from another audience layer.

11. The method of claim 9, wherein said at least one branch value selection comprises a hierarchical family value.

12. The method of claim 9, wherein said at least one branch value selection comprises a category value.

* * * * *